(12) United States Patent
Luh (10) Patent No.: US 6,471,225 B1
(45) Date of Patent: Oct. 29, 2002

(54) SAND BUGGY

(75) Inventor: Tai-Yang Luh, Taichung Hsien (TW)

(73) Assignee: Jenn Jianq Co., Ltd., Taichung Hsien (TW)

( * ) Notice: Subject to any disclaimer, the term of this patent is extended or adjusted under 35 U.S.C. 154(b) by 0 days.

(21) Appl. No.: 09/907,881

(22) Filed: Jul. 17, 2001

(51) Int. Cl.⁷ .............................................. B60G 21/05
(52) U.S. Cl. ........................ 280/124.106; 280/124.111; 280/124.128
(58) Field of Search ................................ 280/781, 785, 280/786, 797, 124.1, 124.107, 124.106, 124.11, 124.111, 124.153, 124.179, 124.128, 788

(56) References Cited

U.S. PATENT DOCUMENTS

| | | | |
|---|---|---|---|
| RE29,849 E | * 11/1978 | Quigniot | 180/337 |
| 4,705,128 A | * 11/1987 | Krude | 180/348 |
| 6,279,931 B1 | * 8/2001 | Kopczynski | 280/124.111 |

\* cited by examiner

*Primary Examiner*—Paul N. Dickson
*Assistant Examiner*—Faye M. Fleming
(74) *Attorney, Agent, or Firm*—Alan D. Kamrath; Rider, Bennett, Egan & Arundel (57) ABSTRACT

A sand buggy has a main frame. A pair of connection rods are disposed on the main frame. A positioning seat which is connected to the connection rods has two lower rotating shafts. A movable mount has two pairs of lug panels to receive the lower rotating shafts. Two front shock absorbers are connected to a-suspension arm and a positioning plate. A first and a second positioning mounts are disposed on the main frame. A first movable seat is inserted in the first positioning mount. A pair of first lug plates are disposed on the first suspension link. A second movable seat is inserted in the second positioning mount. A pair of second lug plates are disposed on the second suspension link. A first rear shock absorber is positioned by the first lug plates. A second rear shock absorber is positioned by the second lug plates. A main shaft is connected to the first and the second rear shock absorbers.

1 Claim, 10 Drawing Sheets

SAND BUGGY

BACKGROUND OF THE INVENTION

The present invention relates to a sand buggy. More particularly, the present invention relates to a sand buggy which has a good shock-absorbing function.

Referring to FIGS. 1 to 5, a conventional sand buggy 10 has a main frame 15, a first front wheel 11, a second front wheel 11', a first rear wheel 13, a second rear wheel 13', a first front shock absorber 12, a second front shock absorber 12', a rear shock absorber 14, a rear wheel shaft 18, a positioning seat 16, a first suspension arm 17, a second suspension arm 17', and a positioning mount 19. The first suspension arm 17 is connected to the first front wheel 11. The second suspension arm 17' is connected to the second front wheel 11'. The positioning seat 16 is disposed on the main frame 15. The positioning seat 16 is connected to the first front shock absorber 12 and the second front shock absorber 12'. The first front shock absorber 12 is connected to the first suspension arm 17. The second front shock absorber 12' is connected to the second suspension arm 17'. The positioning mount 19 is disposed on the rear wheel shaft 18. The rear shock absorber 14 is connected to the main frame 15 and the positioning mount 19. However, the first front shock absorber 12, the second front shock absorber 12', and the rear shock absorber 14 absorb a portion of shock only.

SUMMARY OF THE INVENTION

An object of the present invention is to provide a sand buggy which has a good shock-absorbing result.

Accordingly, a sand buggy comprises a main frame, a front suspension mechanism, a first rear suspension gear, and a second rear suspension gear. A first connection rod is disposed on a front portion of the main frame. A second connection rod is disposed on the front portion of the main frame. The front suspension mechanism has a positioning seat, a movable mount, a suspension arm, a positioning plate, a first front shock absorber, and a second front shock absorber. The positioning seat is connected to the first connection rod and the second connection rod. The positioning seat has two lower rotating shafts. Each of the lower rotating shafts has an inner sleeve. The movable mount has two pairs of lug panels to receive the lower rotating shafts. An opening is formed between the positioning seat and the movable mount. The suspension arm passes through the opening. The suspension arm has a pair of first lug bars and a pair of second lug bars. A positioning plate is disposed on the front portion of the main frame and beneath the first connection rod and the second connection rod. The first front shock absorber is connected to the first lug bars and the positioning plate. The second front shock absorber is connected to the second lug bars and the positioning plate. The first rear suspension gear has a first positioning mount, a first movable seat, and a first suspension link. The first positioning mount is disposed on a first side of the main frame. The first movable seat is inserted in the first positioning mount. The first suspension link is connected to the first movable seat. A pair of first lug plates. are disposed on the first suspension link. The second rear suspension gear has a second positioning mount, a second movable seat, and a second suspension link. The second positioning mount is disposed on a second side of the main frame. The second movable seat is inserted in the second positioning mount. The second suspension link is connected to the second movable seat. A pair of a second lug plates are disposed on the second suspension link. A first rear shock absorber has a first lower end disposed between the first lug plates, and a first hollow upper end. A second rear shock absorber has a second lower end disposed between the second lug plates, and a second hollow upper end. A main shaft has a first distal end inserted in the first hollow upper end of the first rear shock absorber and a second distal end inserted in the second hollow upper end of the second rear shock absorber.

DETAILED DESCRIPTION OF THE INVENTION

Referring to FIGS. 6 to 10, a sand buggy comprises a main frame 23, a first front wheel 21, a second front wheel 21', a first rear wheel 22, a second rear wheel 22', a front suspension mechanism 30, a first rear suspension gear 40, and a second rear suspension gear 40'.

A first connection rod 24 is disposed on a front portion of the main frame 23.

A second connection rod 24' is disposed on the front portion of the main frame 23.

The front suspension mechanism 30 has a positioning seat 31, a movable mount 34, a suspension arm 37, a positioning plate 25, a first front shock absorber 301, and a second front shock absorber 301'.

The positioning seat 31 is connected to the first connection rod 24 and the second connection rod 24'.

The positioning seat 31 has two lower rotating shafts 32.

Each of the lower rotating shafts 32 has an inner sleeve 33.

The movable mount 34 has two pairs of lug panels 35 to receive the lower rotating shafts 32.

An opening 300 is formed between the positioning seat 31 and the movable mount 34.

The suspension arm 37 passes through the opening 300. The suspension arm 37 has a pair of first lug bars 38 and a pair of second lug bars 38'.

The positioning plate 25 is disposed on the front portion of the main frame 23 and beneath the first connection rod 24 and the second connection rod 24'.

The first front shock absorber 301 is connected to the first lug bars 38 and the positioning plate 25.

The second front shock absorber 301' is connected to the second lug bars 38' and the positioning plate 25.

The first rear suspension gear 40 has a first positioning mount 41, a first movable seat 43, and a first suspension link 44.

The first positioning mount 41 is disposed on a first side of the main frame 23.

The first movable seat 43 is inserted in the first positioning mount 41.

The first suspension link 44 is connected to the first movable seat 43.

A pair of first lug plates 45 are disposed on the first suspension link 44.

The second rear suspension gear 40' has a second positioning mount 41', a second movable seat 43', and a second suspension link 44'.

The second positioning mount 41' is disposed on a second side of the main frame 23.

The second movable seat 43' is inserted in the second positioning mount 41'.

The second suspension link 44' is connected to the second movable seat 43'.

A pair of second lug plates 45' are disposed on the second suspension link 44'.

A first rear shock absorber 50 has a first lower end 51 disposed between the first lug plates 45, and a first hollow upper end 52.

A second rear shock absorber 50' has a second lower end 51' disposed between the second lug plates 45', and a second hollow upper end 52'.

A main shaft 27 has a first distal end N inserted in the first hollow upper end 52 of the first rear shock absorber 50 and a second distal end N' inserted in the second hollow upper end 52' of the second rear shock absorber 50'.

Each of the lug panels 35 has a pivot aperture 36.

Two bolts P fasten the lug panels 35 and the lower rotating shafts 32 together.

Each of the first lug bars 38 has a round hole 39.

The positioning plate 25 has two pivot holes 26.

The first positioning mount 41 has a circular aperture 42.

A bolt P fastens the first positioning mount 41 and the first movable seat 43 together.

Each of the first lug plates 45 has a first round aperture 46.

Each of the second lug plates 45' has a second round aperture 46'.

A bolt P fastens the first lower end 51 of the first rear shock absorber 50 and the first lug plates 45 together.

A bolt P fastens the second lower end 51' of the second rear shock absorber 50' and the second lug plates 45' together.

Referring to FIG. 9 again, the movable mount 34 is vibrated according to a bump condition of a road.

Referring to FIG. 10 again, the first movable seat 43 and the second movable seat 43' are vibrated according to the bump condition of the road.

Figure 1:
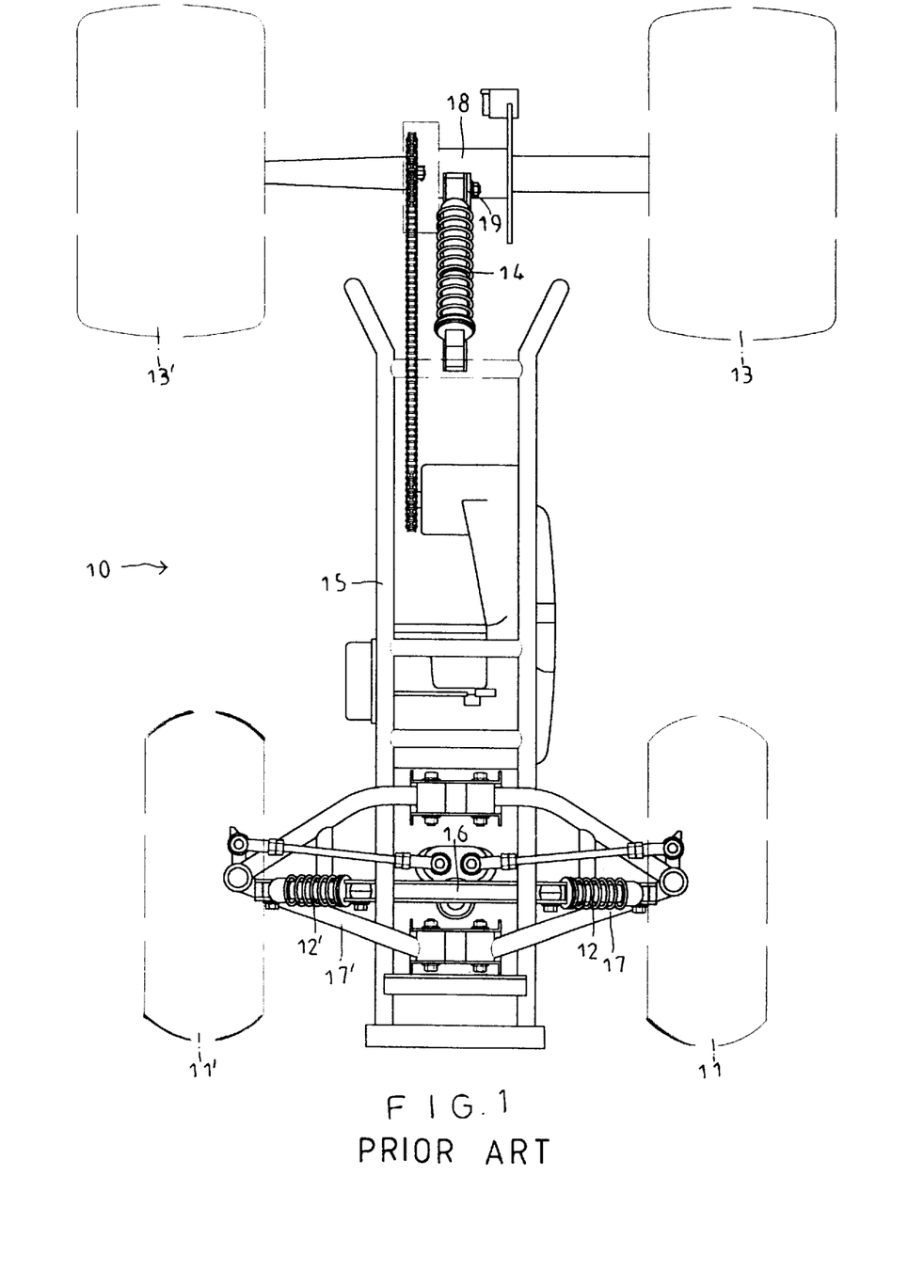
FIG. 1 is a perspective view of a sand buggy of the prior art.
Figure 2:
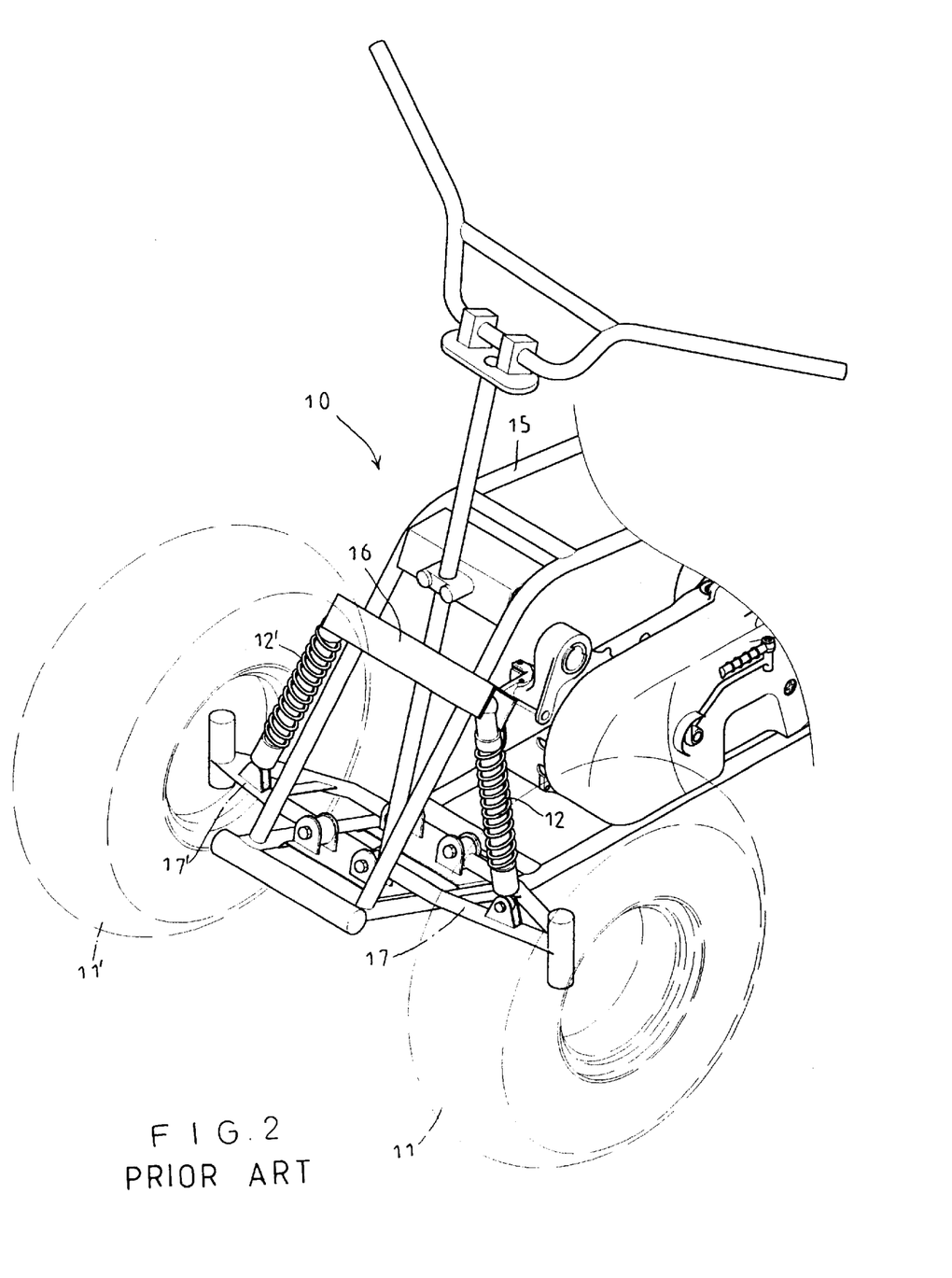
FIG. 2 is a partially perspective view of a sand buggy of the prior art.
Figure 3:
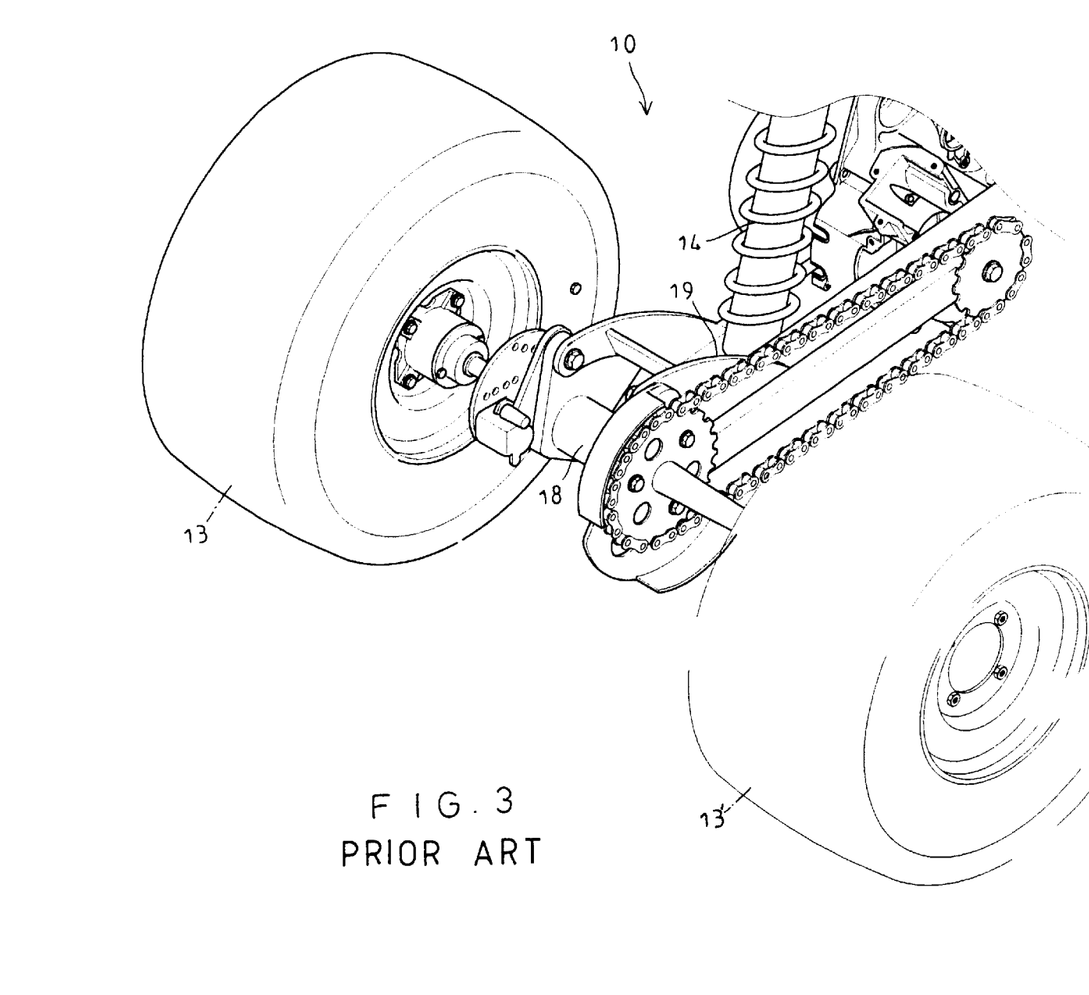
FIG. 3 is another partially perspective view of a sand buggy of the prior art.
Figure 4:
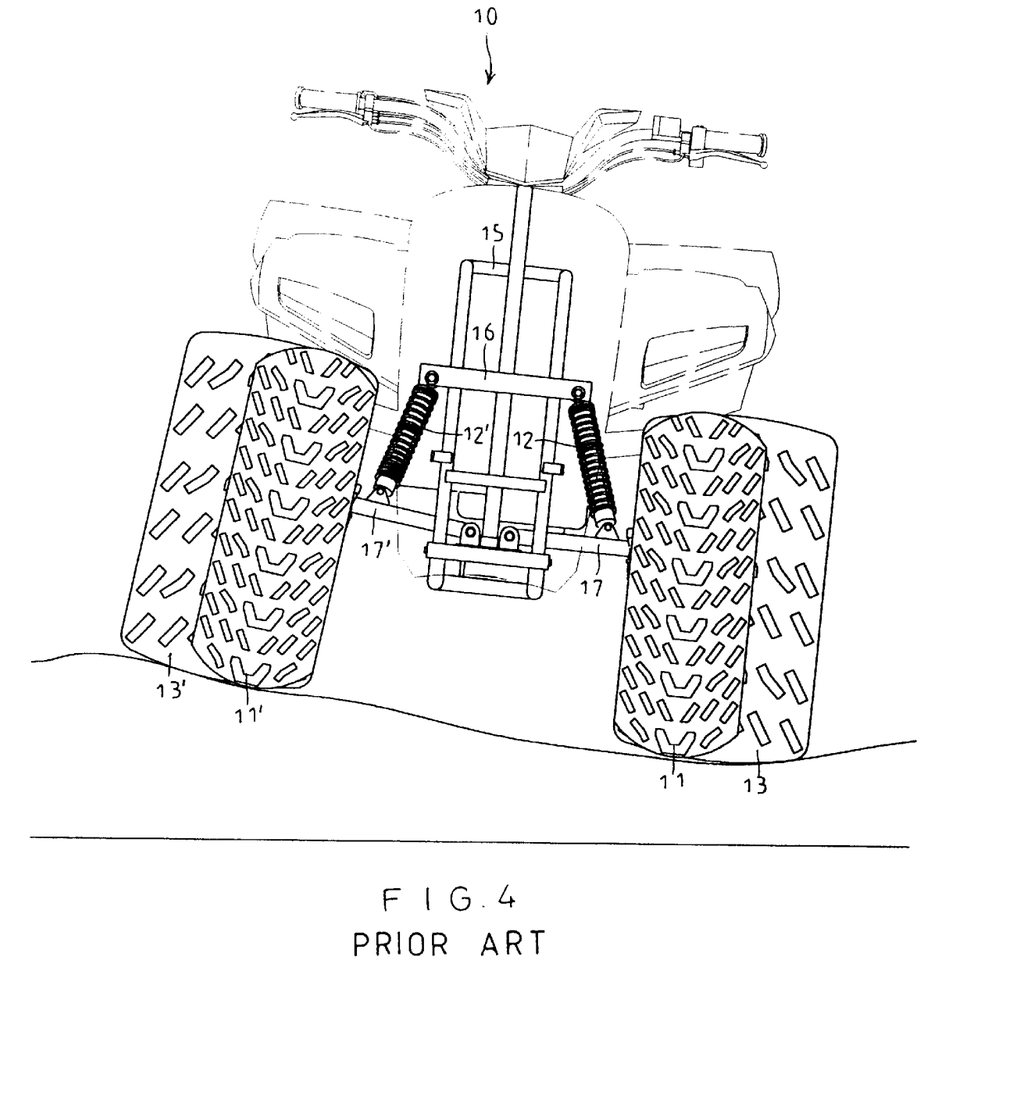
FIG. 4 is a schematic view illustrating an operation of two front wheels of a sand buggy of the prior art.
Figure 5:
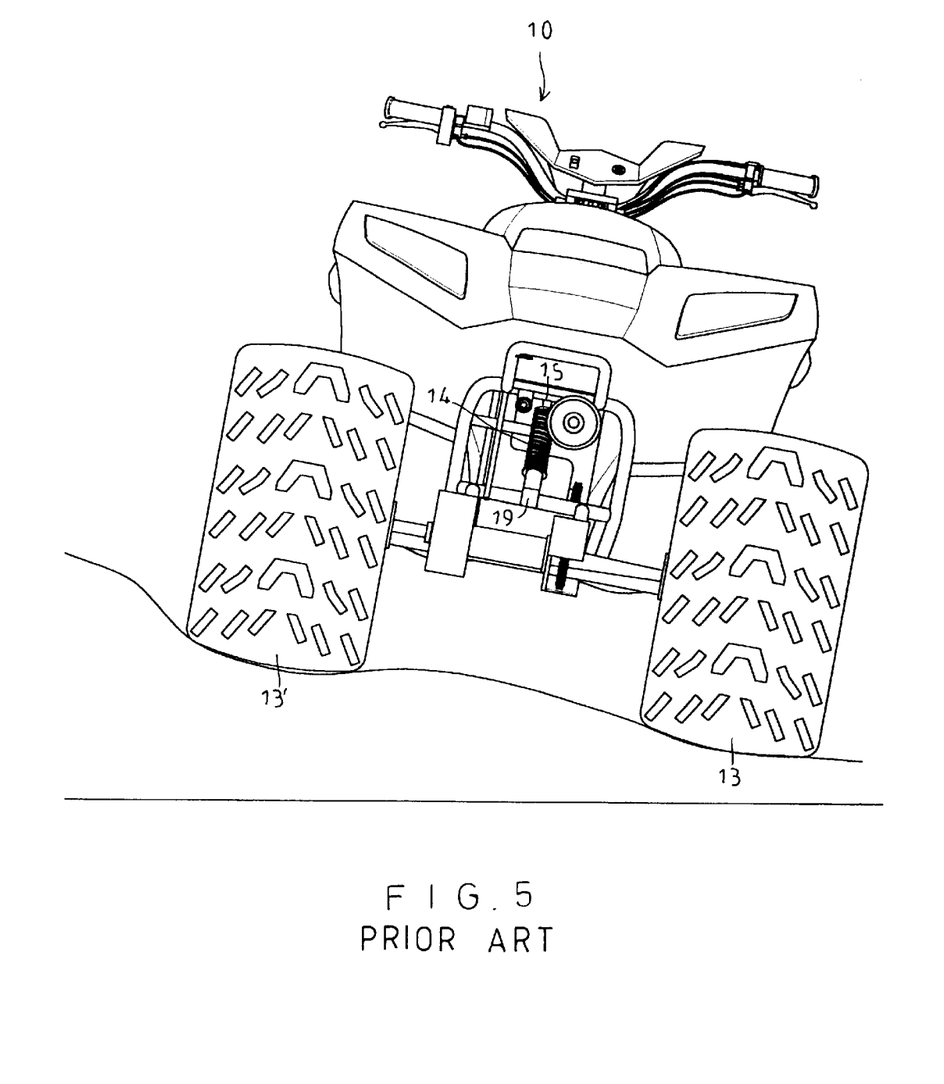
FIG. 5 is a schematic view illustrating an operation of two rear wheels of a sand buggy of the prior art.
Figure 6:
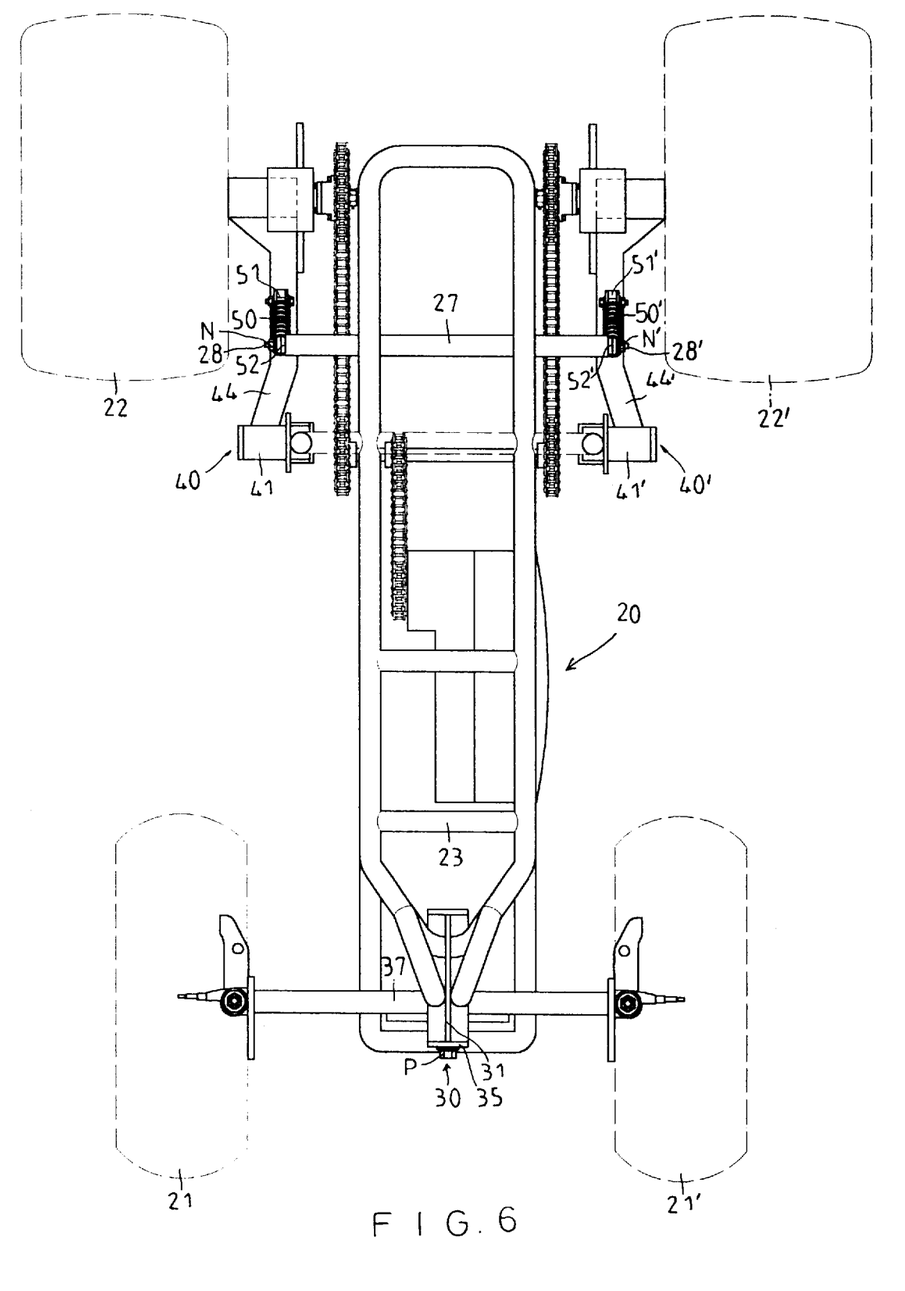
FIG. 6 is a perspective view of a sand buggy of a preferred embodiment in accordance with the present invention.
Figure 7:
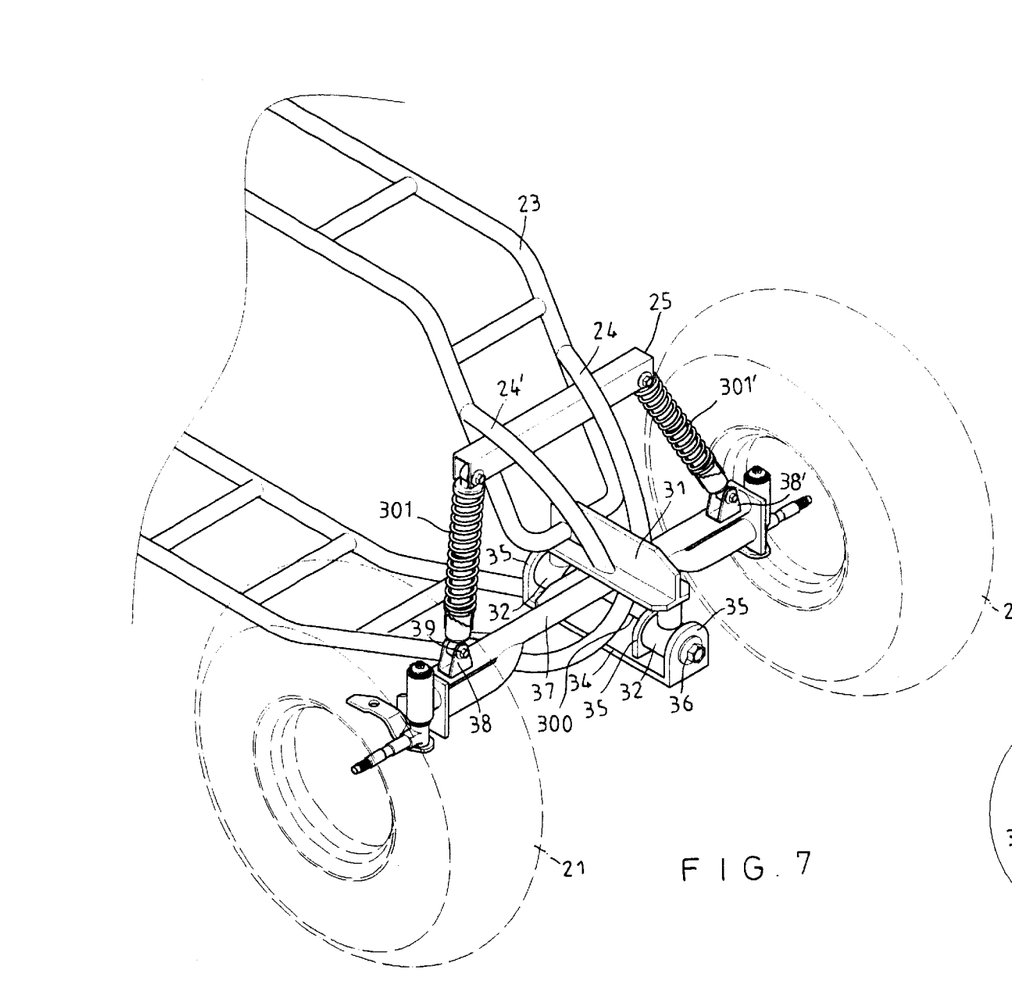
FIG. 7 is a partially perspective view of a sand buggy of a preferred embodiment in accordance with the present invention.
Figure 7A:
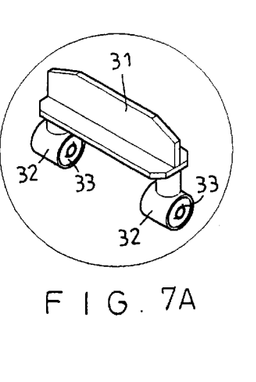
FIG. 7A is a perspective view of a positioning seat of a preferred embodiment in accordance with the present invention.
Figure 8:
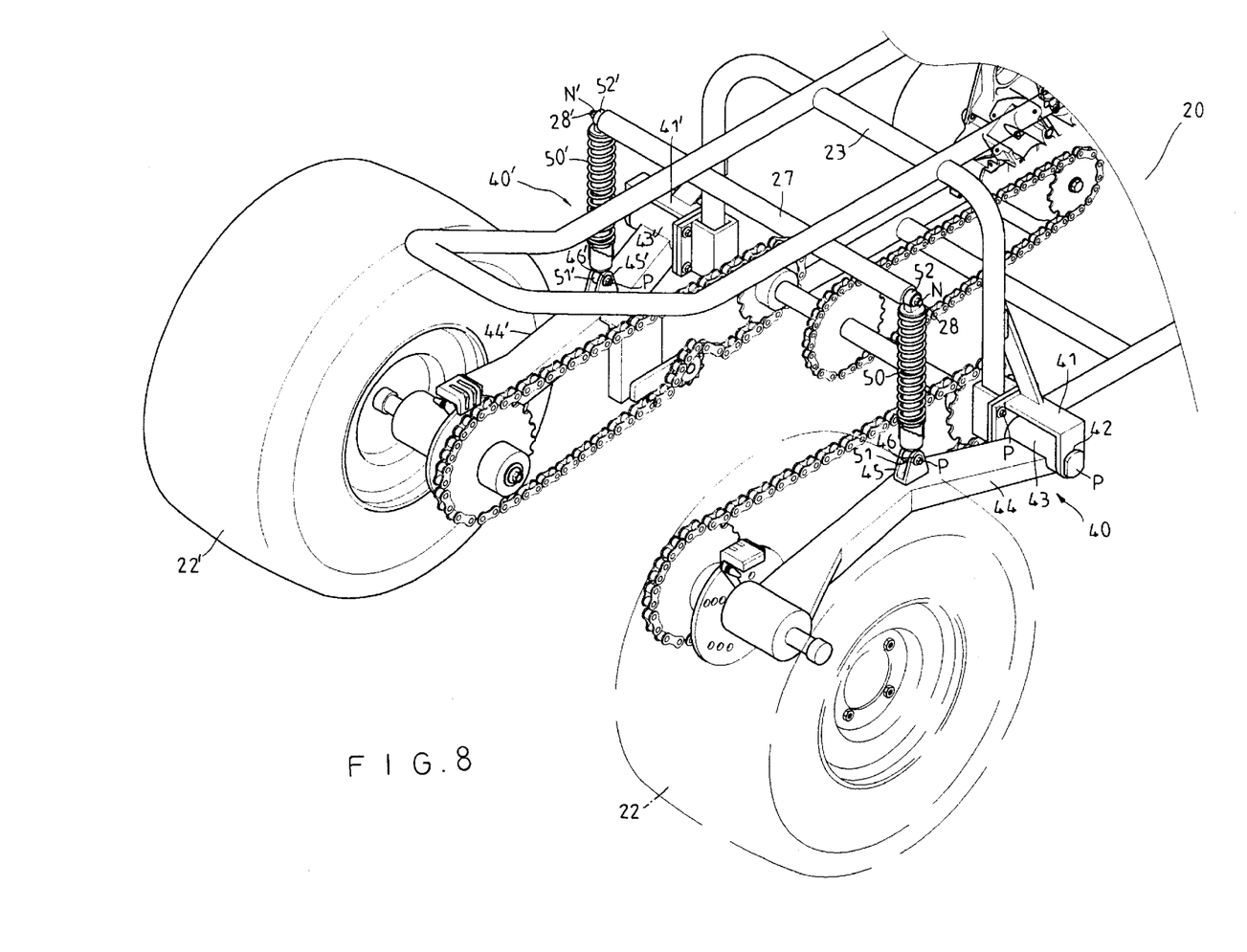
FIG. 8 is another partially perspective view of a sand buggy of a preferred embodiment in accordance with the present invention.
Figure 9:
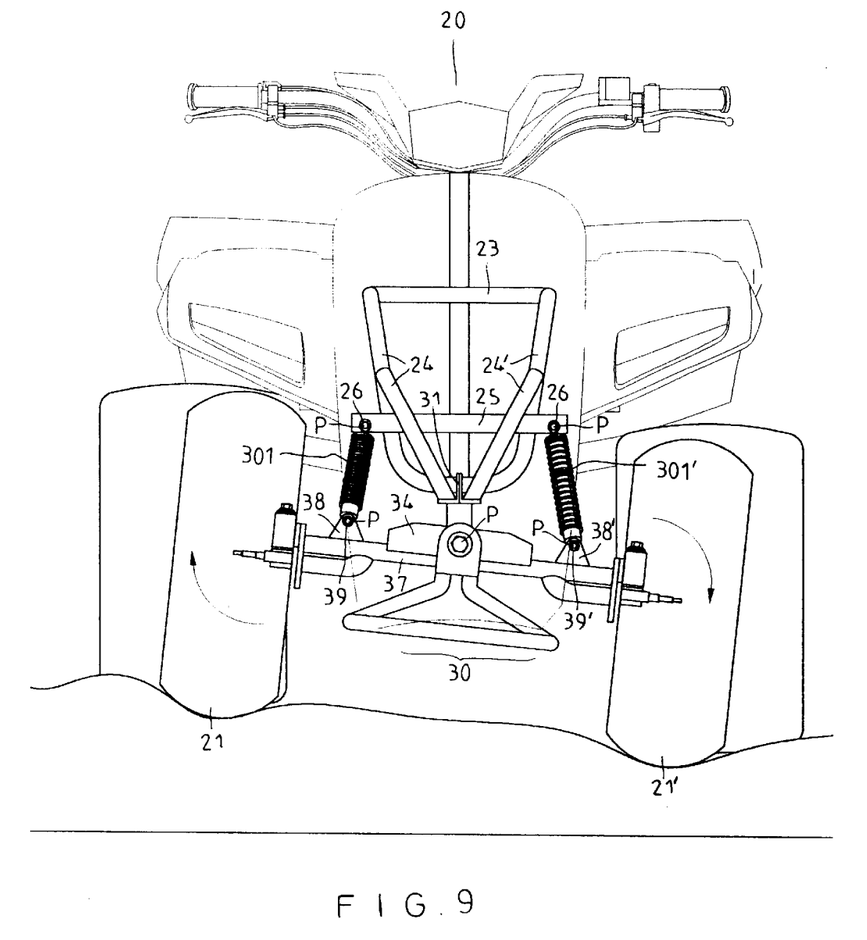
FIG. 9 is a schematic view illustrating an operation of two front wheels of a sand buggy of a preferred embodiment in accordance with the present invention.
Figure 10:
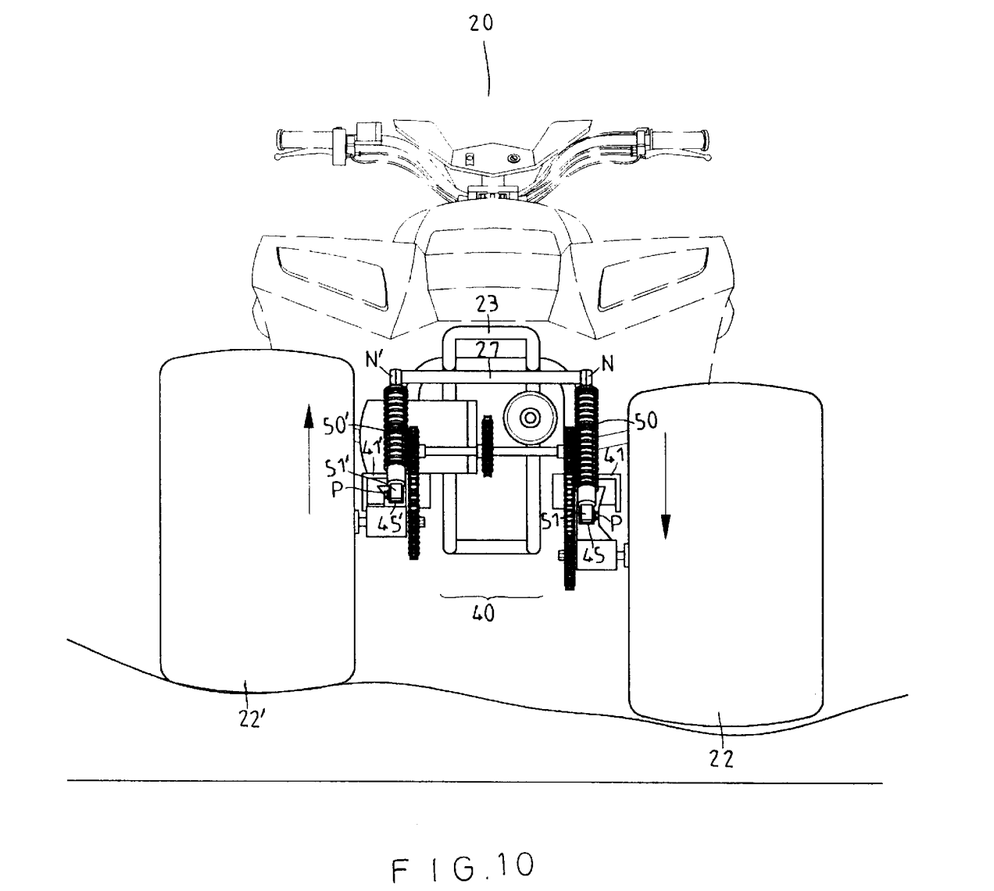
FIG. 10 is a schematic view illustrating an operation of two rear wheels of a sand buggy of a preferred embodiment in accordance with the present invention.

Since the first movable seat 43 and the second movable seat 43' are independent, the shock-absorbing functions of the first movable seat 43 and the second movable seat 43' are very good.

The present invention is not limited to the above embodiment but various modification thereof may be made. Furthermore, various changes in form and detail may be made without departing from the scope of the present invention.

I claim:

1. A sand buggy comprises:
    a main frame, a front suspension mechanism, a first rear suspension gear, and a second rear suspension gear,
    a first connection rod disposed on a front portion of the main frame,
    a second connection rod disposed on the front portion of the main frame,
    the front suspension mechanism having a positioning seat, a movable mount, a suspension arm, a positioning plate, a first front shock absorber, and a second front shock absorber,
    the positioning seat connected to the first connection rod and the second connection rod,
    the positioning seat having two lower rotating shafts,
    each of the lower rotating shafts having an inner sleeve,
    the movable mount having two pairs of lug panels to receive the lower rotating shafts,
    an opening formed between the positioning seat and the movable mount,
    the suspension arm passing through the opening,
    the suspension arm having a pair of first lug bars and a pair of second lug bars,
    a positioning plate disposed on the front portion of the main frame and beneath the first connection rod and the second connection rod,
    the first front shock absorber connected to the first lug bars and the positioning plate,
    the second front shock absorber connected to the second lug bars and the positioning plate,
    the first rear suspension gear having a first positioning mount, a first movable seat, and a first suspension link,
    the first positioning mount disposed on a first side of the main frame,
    the first movable seat inserted in the first positioning mount, the first suspension link connected to the first movable seat, a pair of first lug plates disposed on the first suspension link, the second rear suspension gear having a second positioning mount, a second movable seat, and a second suspension link, the second positioning mount disposed on a second side of the main frame, the second movable seat inserted in the second positioning mount, the second suspension link connected to the second movable seat, a pair of second lug plates disposed on the second suspension link, a first rear shock absorber having a first lower end disposed between the first lug plates, and a first hollow upper end, a second rear shock absorber having a second lower end disposed between the second lug plates, and a second hollow upper end, and a main shaft having a first distal end inserted in the first hollow upper end of the first rear shock absorber and a second distal end inserted in the second hollow upper end of the second rear shock absorber.

* * * * *